United States Patent [19]
Weaver

[11] Patent Number: 4,518,329
[45] Date of Patent: May 21, 1985

[54] WEAR RESISTANT PUMP VALVE

[76] Inventor: Joe T. Weaver, 2409 Fannin, Midland, Tex. 79705

[21] Appl. No.: 595,553

[22] Filed: Mar. 30, 1984

[51] Int. Cl.³ .................... F04B 21/00; F04B 21/06; F16K 15/14; F16K 17/04
[52] U.S. Cl. .................... 417/566; 137/516.25; 137/516.27; 137/516.29; 251/332
[58] Field of Search .................... 417/566; 137/516.25, 137/516.27, 516.29; 251/332

[56] References Cited

U.S. PATENT DOCUMENTS

| | | | |
|---|---|---|---|
| 1,948,628 | 2/1934 | Penick et al. | 251/332 |
| 1,966,264 | 7/1934 | Roye | 251/332 |
| 2,495,880 | 1/1950 | Volpin | 137/516.29 |
| 2,985,424 | 5/1961 | Anderson et al. | 251/332 |
| 3,057,372 | 10/1962 | Sutton et al. | 251/332 |
| 3,134,572 | 5/1964 | Glasgow | 251/332 |
| 3,409,039 | 11/1968 | Griffin | 137/516.29 |
| 3,419,041 | 12/1968 | Jennings | 251/332 |
| 4,015,815 | 4/1977 | Leisner | 251/332 |

FOREIGN PATENT DOCUMENTS

| | | | |
|---|---|---|---|
| 643111 | 6/1962 | Canada | 137/516.29 |
| 1236290 | 3/1967 | Fed. Rep. of Germany | 137/516.29 |
| 673790 | 7/1979 | U.S.S.R. | 417/566 |

*Primary Examiner*—William L. Freeh
*Attorney, Agent, or Firm*—Gunn, Lee & Jackson

[57] ABSTRACT

A fluid pressure energized wear resistant pump valve is provided having a valve body and seal retainer formed of metal which secure a seal insert in assembly therewith. The seal insert incorporates an elastomeric sealing portion having a frusto-conical sealing surface for engagement with a valve seat of corresponding configuration. An anti-extrusion member is secured in assembly with the elastomeric seal portion and is composed of non-metal material of greater hardness than the hardness of the elastomeric material. The anti-extrusion member forms a frusto-conical sealing surface disposed in contiguous relation with the sealing surface of the elastomeric seal member. The anti-extrusion member further defines a tapered, yieldable peripheral sealing lip which yields responsive to pressure conditions to prevent pressure induced extrusion and damage to the elastomeric sealing member.

7 Claims, 9 Drawing Figures

WEAR RESISTANT PUMP VALVE

FIELD OF THE INVENTION

This invention relates generally to fluid energized pump valves and more specifically concerns a pump valve assembly incorporating a wear resistant seal insert which minimizes any tendency of seal extrusion and thereby minimizes pressure induced wear of the seal assembly.

BACKGROUND OF THE INVENTION

When a viscous liquid, such as drilling fluid, is pumped under high pressure conditions, various simultaneously occurring detrimental conditions cause failure of valves and valve seats. In some cases, metal parts of valves and valve seats become excessively worn either by the cutting, abrasive activity of high pressure liquid containing abrasive constituents. It is not unusual for a valve and valve seat to become eroded by high pressure drilling fluid in a relatively short period of time when seal leakage occurs during pumping operations. During each pumping stroke and suction stroke, extremely high velocity flow conditions occur between the sealing element and seat of the valve mechanism. This high velocity condition, coupled with the abrasive character of the fluid being pumped causes severe erosion conditions within a relatively short period of time.

Another condition which is detrimental to the service life of pump valves is the mechanical shock which is developed as the valve is shifted to its closed position under the influence of spring force and pressure induced force. At times, this mechanical shock can be sufficiently severe to induce metal failure such as by breakage of valve guide stems and other valve parts. Metal failure also occurs when a condition of peening develops due to the mechanical shock of valve closure. Excessively worn valve guides can cause valve stem breakage and can also cause accelerated wear of the valves and valve seats of drilling fluid pumps and other pumps of similar nature.

The problem of seal wear in pump valves is accelerated by a condition known as seal extrusion. Typical pump valves for drilling fluid pumps incorporate a metal valve body having a metal seal retainer ring which is secured by threads to the valve body. The valve body together with the seal retainer ring form a circular seal receptacle within which is retained a circular sealing member composed of elastomeric material. Typically, the sealing ring is replaceable. The retainer ring is provided with hammer lugs, enabling the retainer ring to be driven into tight assembly with the valve body to secure the sealing member in assembly. Conversely, the hammer lugs of the retainer ring permit it to be loosened to thus permit replacement of worn seal rings.

The seal rings of drilling fluid pump valves such as those manufactured by Mission Manufacturing Company of Houston, Tex., typically form a tapered or frusto-conical sealing surface which is slightly offset in comparison to a tapered, frusto-conical sealing surface defined by the valve body. The tapered sealing surface of the seal member is adapted for sealing engagement with a correspondingly tapered frusto-conical seat surface defined by a seat insert with which the pump mechanism is provided. As the valve assembly is seated against the seat surface of the seat insert by a combination of forces including the spring force of the seat assembly and pressure induced forces acting upon the valve assembly, the high pressure condition to which the valve assembly is subjected acts upon the elastomeric sealing element, attempting to force a portion of the sealing element into the narrow space between the valve and valve seat as the valve moves to its fully seated relationship with respect to the seat. This pressure extrusion causes severe tensile stressing of the elastomeric material at the peripheral interface between the sealing element and the metal support surface of the valve body.

Pressure induced deterioration of the elastomer component of pump valves is largely caused by hysteresis. In drilling fluid pumps the valves must operate at from 50 to 150 cycles oer minute. Following a compression or pumping stroke of a positive displacement piston the pump valves operate as check valves, closing under the influence of back pressure as the pistons reverse their reciprocity movement. The back pressure acting on the pistons is severe, causing them to slam to their closed positions. As the valves close the back pressure causes compression throughout the elastomer material of the pump valve. If any voids exist when the valve is seated against the valve seat the elastomer material is pressure induced to deform and thus substantially fill the void. For the most part, such voids will inevitably exist. The elastomeric material will therefore be deformed from 50 to 150 cycles per minute to fill the voids. Though the voids are typically small, being annular crevices, etc., the elastomer deformation necessary to fill the voids, being effective in a limited portion of the seal, will cause severe tensile stress to be placed on limited portions of the sealing element. The hysteresis effect due to cyclic stressing of the elastomeric material will result in material failure in the vicinity of the voids being filled. As elastomer failure occurs, the elastomer material sloughs or is torn away thereby developing an even larger void which must be filled on subsequent closure of the valve. This activity places even greater tensile stress on the remaining elastomeric material, thus causing it to deteriorate further by the hysteresis induced sloughing or tearing activity. Soon sufficient elastomeric sealing material is lost that the sealing capability of the valve becomes impaired, resulting in the necessity for pump shutdown and repair.

It is, of course, desirable to provide a valve and valve seat assembly for high pressure pumps such as drilling fluid pumps which will remain serviceable for extended periods of time to thus minimize repair costs and minimize down time of the pumping mechanism.

SUMMARY OF THE INVENTION

It is therefore a primary feature of the present invention to provide a novel wear resistant pump valve assembly for high pressure liquid pumps which will remain effectively serviceable for extended periods of time.

It is also a feature of this invention to provide a novel, wear resistant pump valve assembly incorporating an elastomeric sealing member and providing means to ensure against pressure induced extrusion of the sealing member.

It is also a feature of this invention to provide a novel valve assembly for high pressure pumps which incorporates a sealing member having portions of varying hardness which cooperate to prevent or minimize seal extrusion during pumping operations.

It is an even further feature of this invention to provide a novel pump valve assembly which incorporates a combination of an elastomeric rubber-like sealing element having a yieldable polymeric anti-extrusion member in intimate assembly therewith which cooperates to define the sealing surface of the seal assembly.

Among the several features of this invention is contemplated the provision of a novel valve assembly for high pressure pumps incorporating a seal member having plural areas of differentiating hardness to provide enhanced structural integrity of the seal and to promote efficient sealing at all pressure conditions.

Briefly, the valve assembly of the present invention incorporates a valve body which may be of conventional configuration, which is adapted to receive a seal retainer element in threaded assembly therewith. The retainer element may also be of conventional configuration, cooperating with the valve body to define an annular seal receptacle. Within the seal receptacle is provided a circular sealing member having a major portion thereof composed of elastomeric sealing material. An outer peripheral portion of the sealing element is defined by a non-metal material of greater hardness or durometer as compared to the hardness of the elastomeric portion of the sealing element. This portion of greater hardness cooperates with the elastomeric portion of the seal to define a frusto-conical sealing surface which contacts a frusto-conical valve seat of corresponding configuration. The seal area of greater hardness, referred to as an anti-extrusion member, may be composed of any one of a number of suitable elastomeric or polymeric materials within the spirit and scope of the present invention. The anti-extrusion member is positioned on the upstream or piston side of the seal assembly so that it provides enhanced structural integrity to enhance the physical capability of the seal to resist excessive seal deformation during valve seating activity. The elastomeric portion and anti-extrusion portion of the sealing element cooperate to define a tapered, flexible anti-extrusion lip on the anti-extrusion member. This tapered lip is yieldable responsive to high pressure conditions along with yielding of the elastomeric material. This cooperative yielding characteristic prevents the development of force levels in the elastomeric material at the interface thereof within the anti-extrusion member which might otherwise cause tearing of the elastomeric material at its interface with the anti-extrusion member. Seal assembly is thus maintained in effective, serviceable condition for extended periods of time as compared to the sealing members of conventional high pressure pump valves.

Although the present invention is discussed herein largely as to elastomeric sealing materials carried by the movable valve element of a pump valve assembly, such is not intended to limit the invention in any manner whatever. The fixed seat portion of pump valve assemblies may also be provided with elastomeric seals incorporating anti-extrusion members within the spirit and scope of this invention.

BRIEF DESCRIPTION OF THE DRAWINGS

So that the manner in which the above-recited features of the present invention are attained and can be understood in detail, more particular description of the invention, briefly summarized above, may be had by reference to the embodiments thereof, which are illustrated in the appended drawings, which drawings form a part of this specification. It is to be noted, however, that the appended drawings illustrate only typical embodiments of the invention, and are therefore not to be considered limiting of its scope, for the invention may admit to other equally effective embodiments.

In the Drawings

Figure 1:
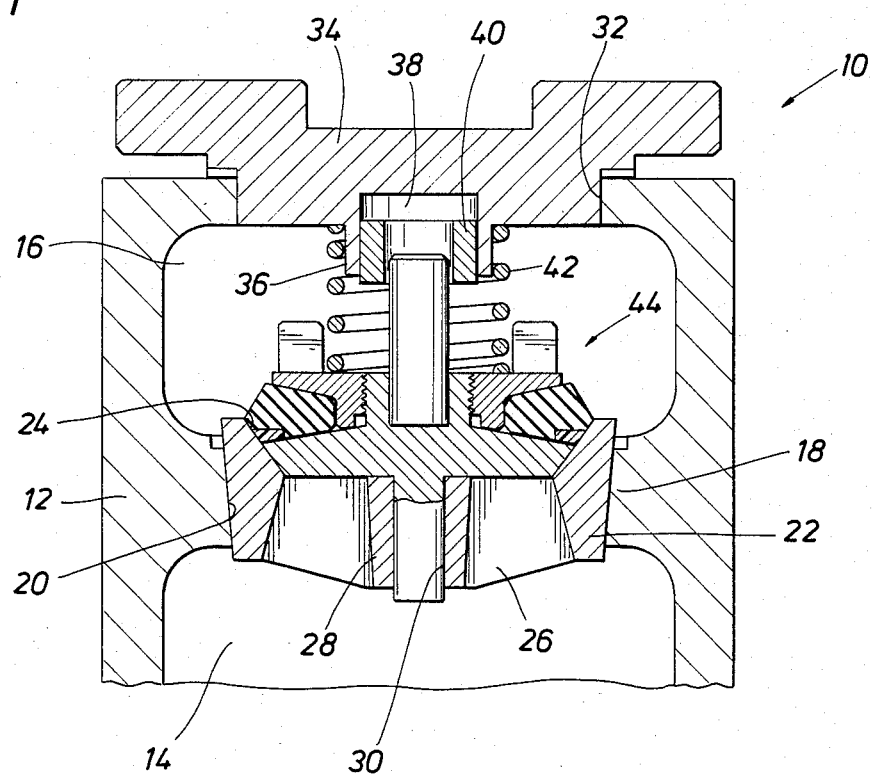

The present invention, both as to its organization and manner of operation, together with further features and advantages thereof, may best be understood by way of illustration and example of certain embodiments when taken in conjunction with the accompanying drawings in which:

FIG. 1 is a sectional view of the valve and valve seat of a high pressure pump mechanism, wherein the valve seat incorporates a sealing assembly constructed in accordance with the present invention.

Figure 2:
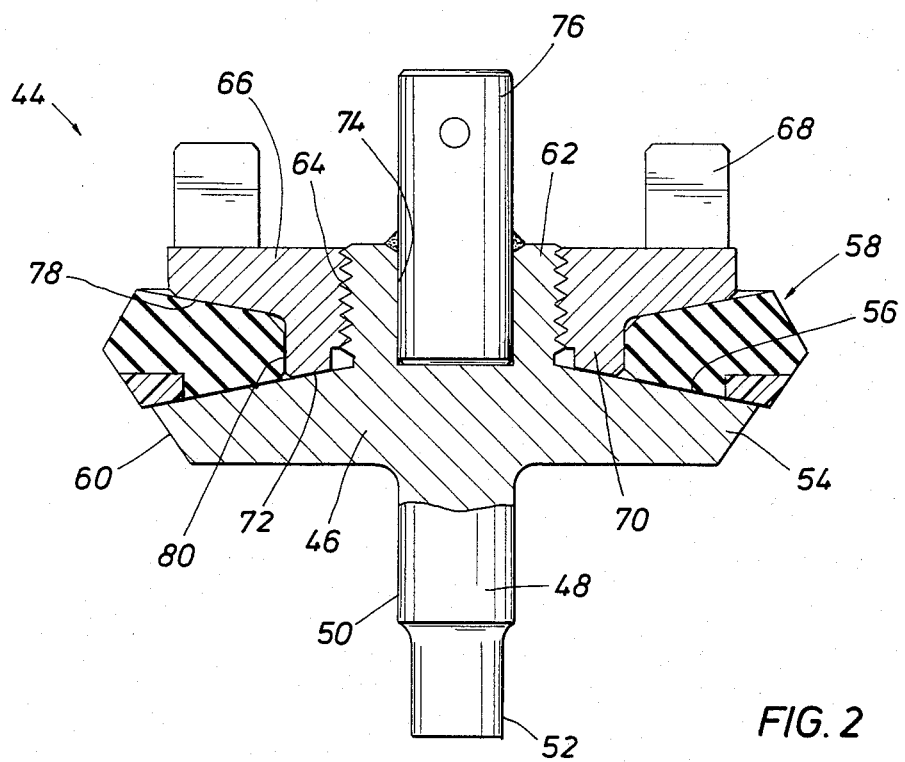

FIG. 2 is a sectional view of the valve assembly of FIG. 1 illustrating the relationship of the seal assembly thereto.

Figure 3:
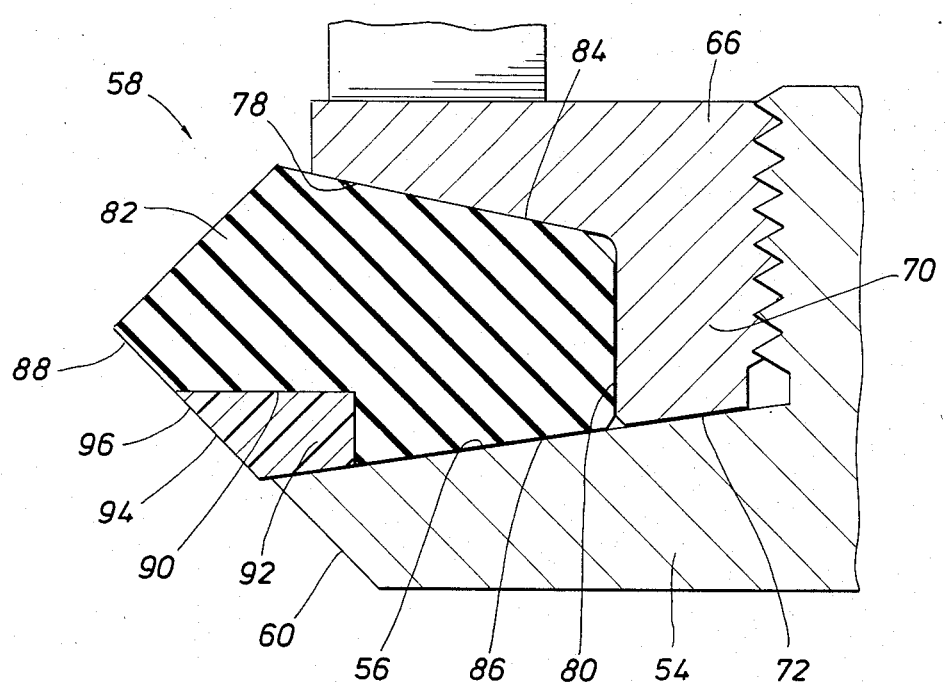

FIG. 3 is a fragmentary sectional view of the valve assembly of FIG. 2, illustrating the structural details of a sealing assembly constituting the preferred embodiment of the present invention.

Figure 4:
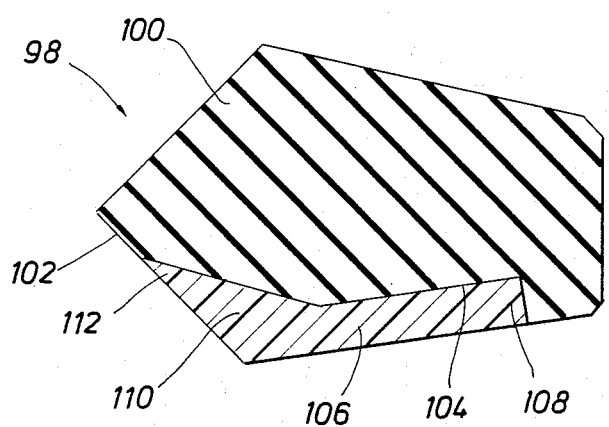

FIG. 4 is a fragmentary sectional view of a sealing assembly similar to that of FIG. 3, and representing a further embodiment of the present invention.

Figure 5:
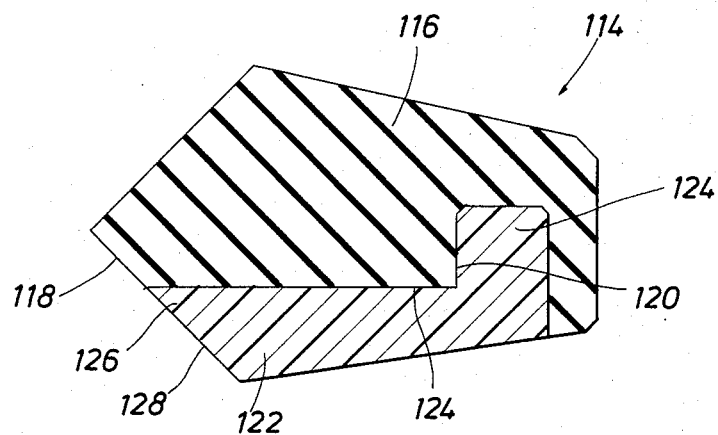

FIG. 5 is a fragmentary sectional view of a sealing assembly similar to that of FIG. 3, and representing a further modified embodiment of the present invention.

Figure 6:
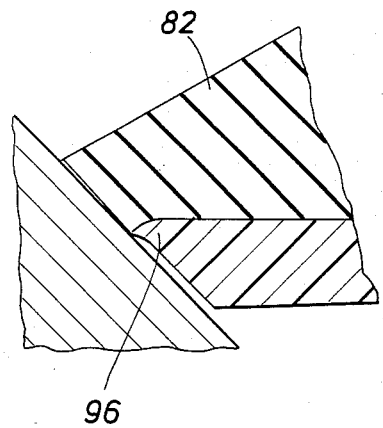

FIG. 6 is a fragmentary sectional view of the sealing assembly of FIGS. 1, 4 or 5, representing the protective activity of the anti-extrusion portion of the seal assembly during valve seating activity.

Figure 7:
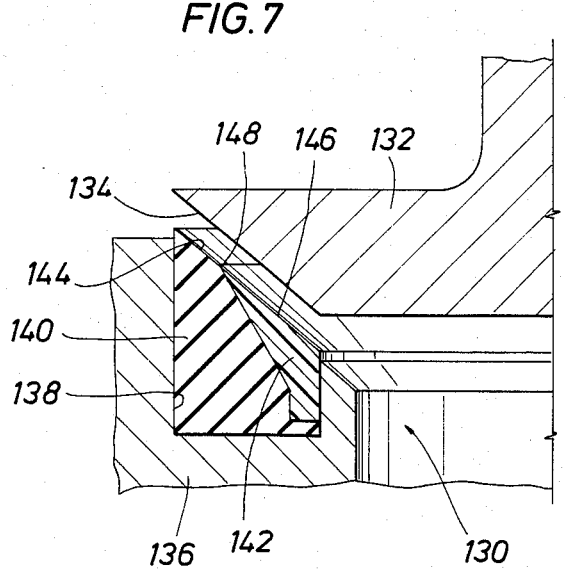

FIG. 7 is a partial sectional view of a pump valve assembly representing a modified embodiment of this invention wherein elastomeric sealing material is incorporated within the valve seat.

Figure 8:
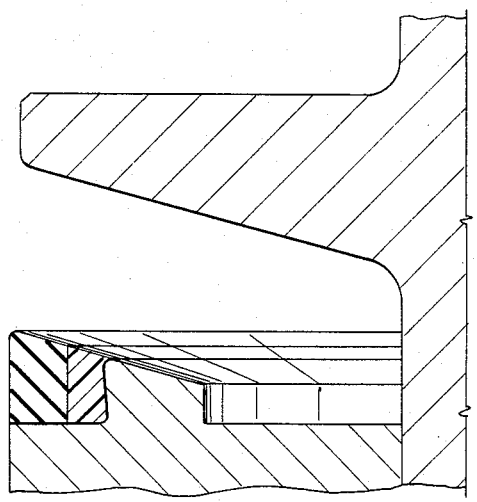
Figure 9:
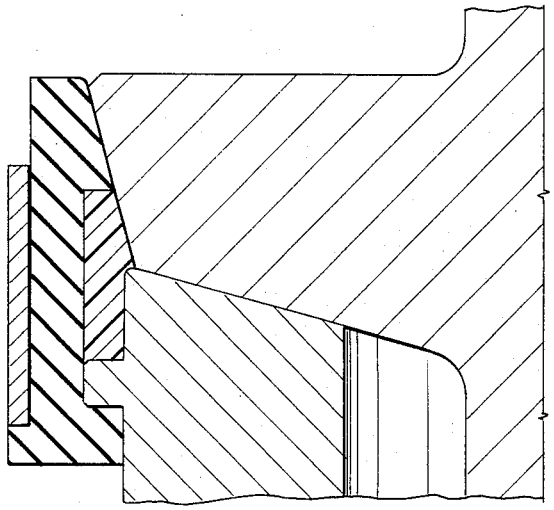

FIGS. 8 and 9 show partial sectional views of alternative embodiments of the invention having valve surfaces in different sealing planes.

DETAILED DESCRIPTION OF PREFERRED EMBODIMENT

Referring now to the drawings, and first to FIG. 1, a fragmentary sectional view of a high pressure pump is illustrated generally at 10 which incorporates a pump body well forming a pressure chamber 14 and a discharge chamber 16 having a structural wall 18 for support of a valve and valve seat assembly. The structural wall 18 defines a tapered circular port 20 within which is seated a seat insert 22 which defines a tapered, frusto-conical seat surface 24, the seat insert 22 also defines cross-arms 26, which provide structural support for a centralized valve guide element 28 having a cylindrical valve guide surface 30 formed therein.

At the upper portion of the discharge chamber 16 is formed a valve access opening 32 which is closed by means of an access cover 34. The access cover defines a centralized boss 36 extending into the discharge chamber and forming a receptacle 38 for a valve guide bushing 40. The boss 36 also functions as a spring retainer to secure one extremity of a compression spring 42, which urges a valve assembly shown generally at 44 to its seated relation with the seat surface 24 of seat insert 22.

The valve assembly is illustrated in detail in FIG. 2 and incorporates a valve body structure 46 having a valve stem 48 projecting therefrom. The valve stem defines a cylindrical guide surface 50 which is adapted to be received in varying engagement with the guide surface 30. The lower portion of the stem is formed to define vice flats 52 enabling it to be mounted in a vice for installation and removal of the sealing element thereof. The valve body 46 incorporates an annular flange 54 of circular configuration defining an upper, tapered seat surface 56 which provides structural support for a circular sealing assembly illustrated generally at 58. The flange portion of the valve body also defines a tapered, frusto-conical sealing surface 60, which is adapted to engage the tapered seat surface 24 of the seat insert to prevent overcompression of the sealing assembly of the valve.

From the upper portion of the valve body extends a retainer boss 62 having an externally threaded portion 64 which receives the internally threaded portion of a circular seal retainer element 66, the seal retainer element is provided with hammer lugs 68, permitting it to be driven into tight, positively secured relation with the valve body. The lower portion of the retainer ring defines a seal support wall 70 having a lower tapered surface 72 which establishes a secure abutting relation with the tapered support surface 56 of the flange. Conversely, a hammer or other suitable device may be utilized to impact the hammer lugs 68 of the retainer member to loosen and unthread it from its secured assembly with the valve body when sealed replacement is desired. The retainer boss 62 also provides a seat 74 for a guide stem 76 that is welded to the upper portion of the boss. The guide stem 76 is received in bearing engagement within the central opening of the guide bushing 40, thus, the valve assembly is guided during its opening and closing movement, and is accurately positioned with respect to the valve seat to minimize transverse thrust forces during valve closure. The seal retainer element 66 defines an upper tapered support surface 78 which cooperates with the tapered surface 56 to define a circular seal receptacle 80.

The seal assembly 58 is illustrated in greater detail in FIG. 3, and defines an elastomeric seal body portion 82 having tapered upper and lowr surfaces 84 and 86 corresponding to the tapered surfaces 56 and 78 of the valve body flange and seal retainer. The elastomeric seal body also forms a frusto-conical sealing surface 88 which is adapted for sealing contact with the tapered seat surface 24 of the seat insert.

In order to prevent extrusion of the elastomeric material of the sealing member 82, the sealing body is formed to define a circular recess 90 within which is retained a circular anti-extrusion member 92. The anti-extrusion member fills the circular recess 90 thereby causing the configuration of the seal assembly to substantially conform to the configuration of conventional replaceable elastomeric seals for pump valves. The anti-extrusion member 92 also forms a frusto-conical sealing surface 94, which is contiguous and coextensive with the frusto-conical sealing surface 88 of the elastomeric body portion 82 of the seal assembly.

The anti-extrusion member 92 is tapered to a thin, flexible lip 96 at its outer peripheral area of juncture with the frusto-conical sealing surface 88. The anti-extrusion member is formed of any one of a number of suitable resilient materials, which are of greater hardness or durometer as compared to that of the elastomeric sealing body 82. The anti-extrusion member is sufficiently yieldable at the thin, knife-edged circular edge portion or lip 96 essentially as shown in FIG. 6. As the valve assembly approaches its seated relationship with the tapered sealing surface 24 of the seat insert, the velocity of the high pressure fluid passing through the clearance between the tapered sealing surfaces of the seat and seal assembly will increase drastically. This high velocity, high pressure flow of liquid tends to force the elastomeric sealing material towards the area of low pressure. As the piston of the pump is retracted following a pumping stroke, a low pressure is developed in the pumping chamber below the valve. If the material immediately below the elastomeric sealing material is metal and therefore unyieldable, the elastomeric sealing material at the interface between the metal support and the elastomeric seal body will tend to become extruded into the narrow space that exists immediately before valve closure. When the elastomeric material is extruded in this manner, it tears and becomes eroded away in the immediate vicinity of the juncture of metal and elastomeric materials.

As shown in FIG. 6, the thin yieldable circular lip 96 of the anti-extrusion member provides structural support for the elastomeric material. Further, as the elastomeric material yields toward the low pressure area responsive to fluid pressure, the thin circular lip portion 96 of the anti-extrusion member will yield radially outwardly in the manner shown in FIG. 6. This radially outward yielding of the thin lip portion of the anti-extrusion member will greatly minimize tearing or other deterioration of the elastomeric sealing member by pressure-induced extrusion.

In FIG. 4, a seal assembly of modified configuration is illustrated generally at 98 incorporating an elastomeric seal body portion 100 which forms a frusto-conical sealing surface 102 and a receptacle 104 for an anti-extrusion member 106. The anti-extrusion member incorporates a flange portion 108 and a sealing portion 110. The sealing portion 110 is formed to define a thin tapered circular sealing lip 112 which is yieldable responsive to conditions of pressure differential in a manner discussed above in connection with FIG. 3.

In FIG. 5, a pump valve seal assembly is illustrated generally at 114 which incorporates a circular seal body 116 defining a frusto-conical sealing surface 118 and a recess 120 receiving an anti-extrusion member 122. The anti-extrusion member defines a circular locking flange 124 which establishes an interlocking relationship with the elastomeric material of the body portion 116 of the sealing element. The anti-extrusion member 122 also defines a thin circular lip portion 126 which flexes outwardly and downwardly to minimize pressure induced extrusion of the elastomeric material forming the seal body 116. The anti-extrusion member 122 also forms a frusto-conical sealing surface 128 which engages the tapered seat surface of the seat insert in the fully closed position of the valve to thus provide efficient sealing capability. The seal assemblies of both FIGS. 4 and 5 are of enhanced structural integrity due to the presence of the anti-extrusion members 106 and 122, respectively.

As mentioned above, it is within the spirit and scope of the present invention to provide a pump valve mechanism having a metal movable valve element and a seat construction incorporating elastomeric sealing material having anti-extrusion material incorporated therewith. As shown in FIG. 7, a pump valve mechanism is illustrated generally at 130 by way of the fragmentary sectional view. The pump valve mechanism 130 incorporates a metal valve element 132 which is movable between open and closed positions responsive to pressure inducement. The valve member defines a frusto-conical sealing surface 134 which is adapted to establish sealing engagement with a tapered sealing surface of mating frusto-conical configuration. The valve mechanism incorporates a seat body structure 136 which defines a seat receptacle 138 in which is disposed a seal assembly 140 having a body of elastomeric material and an anti-extrusion member 142. The anti-extrusion member is composed of any one of a number of suitable polymeric materials that are substantially more rigid as compared to the elastomeric sealing material but are somewhat yieldable responsive to pressure inducement. The seat assembly defines a tapered seat surface formed partly by a tapered surface segment 144 defined by the elastomeric sealing material and a tapered surface segment 146 defined by the anti-extrusion member. As the valve member 132 is closed, the tapered surface 134 thereof contacts the surface segments 144 and 146 which are coextensive with one another. The anti-extrusion member also defines a knife edge 148 which is yieldable as the elastomeric member 140 is subjected to pressure inducement. Yielding of the knife edge portion 148 of the anti-extrusion member in this manner will prevent the development of any voids which would subject the elastomeric material to excessive tensile deformation as the valve member closes. The flexible lip portion 148 of the anti-extrusion member also provides the elastomeric member with support to thus resist excessive tensile yielding of the elastomeric material. The elastomeric material is therefore protected against excessive tensile yielding by the anti-extrusion member and thus hysteresis induced deterioration of the elastomeric material is effectively minimized.

In view of the foregoing, it is apparent that my invention is one well adapted to attain all of the objects and advantages hereinabove set forth, together with other advantages, which will become obvious and inherent from a description of the apparatus itself. It will be understood that certain combinations and subcombinations are of utility and may be employed without reference to other features and subcombinations. This is contemplated by and is within the scope of the present invention.

What is claimed is:

1. A fluid pressure energized pump valve, comprising:
    (a) a valve body;
    (b) a seal retainer element being threadedly secured to said valve body and cooperating therewith to define a circular sel receptacle;
    (c) a circular elastomeric sealing element being retained within said seal receptacle by said retainer element and forming a frusto-conical sealing surface adapted to engage a frusto-conical valve seat of corresponding configuration; and
    (d) an anti-extrusion member formed of non-metal material of greater hardness than the elastomeric material of said sealing element and being secured in assembly with said sealing element, said anti-extrusion member defining a frusto-conical sealing surface coextensive with said frusto-conical sealing surface of said sealing element for sealing engagement with said frusto-conical valve seat, said anti-extrusion member being located at the downstream portion of said circular elastomeric sealing element and forming a circular yieldable marginal lip at the intersection thereof with said frusto-conical sealing surface of said circular elastomeric sealing element, said circular yieldable marginal lip of said anti-extrusion member yielding radially outwardly responsive to pressure and establishing sealing engagement with said frusto-conical valve seat, providing structural support for said elastomeric sealing element and minimizing extrusion of said elastomeric sealing element.

2. A fluid energized pump valve as recited in claim 1, wherein:
    said anti-extrusion member is integral bonded assembly with said sealing element.

3. A fluid energized pump valve as recited in claim 1, wherein:
    said anti-extrusion member and sealing member are mechanically interlocked.

4. A fluid energized pump valve as recited in claim 1, wherein:
    said anti-extrusion member is composed of a rubber-like material of greater durometer as compared to the durometer of the material of said elastomeric sealing element.

5. A fluid energized pump valve as recited in claim 1, wherein:
    said anti-extrusion member is composed of a polymer.

6. A fluid energized pump valve as recited in claim 1, wherein:
    said anti-extrusion member is in integral assembly with said elastomeric sealing element.

7. A fluid energized pump valve as recited in claim 1, wherein:
    said anti-extrusion member and said elastomeric sealing member are separable to permit replacement of either.

* * * * *